(12) United States Patent
Hokenek et al.

(10) Patent No.: US 6,990,509 B2
(45) Date of Patent: Jan. 24, 2006

(54) ULTRA LOW POWER ADDER WITH SUM SYNCHRONIZATION

(75) Inventors: Erdem Hokenek, Yorktown Heights, NY (US); Eko Lisuwandi, Cambridge, MA (US); David Meltzer, Wappingers Falls, NY (US); Mayan Moudgill, White Plains, NY (US); Victor V. Zyuban, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 10/093,973

(22) Filed: Mar. 8, 2002

(65) Prior Publication Data

US 2003/0172102 A1 Sep. 11, 2003

(51) Int. Cl.
*G06F 7/50* (2006.01)

(52) U.S. Cl. ..................... 708/707; 708/706

(58) Field of Classification Search ......... 708/700–714
See application file for complete search history.

(56) References Cited

U.S. PATENT DOCUMENTS

| | | | | |
|---|---|---|---|---|
| 3,553,446 A | * | 1/1971 | Kruy | 708/714 |
| 4,623,982 A | * | 11/1986 | Ware | 708/714 |
| 4,683,548 A | * | 7/1987 | Mlynek | 708/707 |
| 4,885,716 A | * | 12/1989 | Little | 708/707 |
| 4,982,352 A | * | 1/1991 | Taylor et al. | 708/201 |
| 5,631,860 A | * | 5/1997 | Morinaka | 708/710 |
| 5,636,157 A | * | 6/1997 | Hesson et al. | 708/714 |
| 5,838,602 A | * | 11/1998 | Feiller et al. | 708/714 |
| 6,188,240 B1 | * | 2/2001 | Nakaya | 708/711 |
| 6,829,729 B2 | * | 12/2004 | Hicks et al. | 714/30 |

* cited by examiner

*Primary Examiner*—Todd Ingberg
*Assistant Examiner*—Chat C. Do
(74) *Attorney, Agent, or Firm*—Scully, Scott, Murphy & Presser; Robert M. Trepp, Esq.

(57) ABSTRACT

An ultra low power adder with sum synchronization which provides a power reduction method in the binary carry propagate adders by using a carry skip technique. The invention eliminates glitches at the adder outputs by preventing signal transitions at the sum outputs until the corresponding carry signals have reached their final values, which is achieved by adding a synchronization circuitry to the sum calculation path.

14 Claims, 6 Drawing Sheets

Alternative Single Bit Adder

Conventional Signal Bit Adder

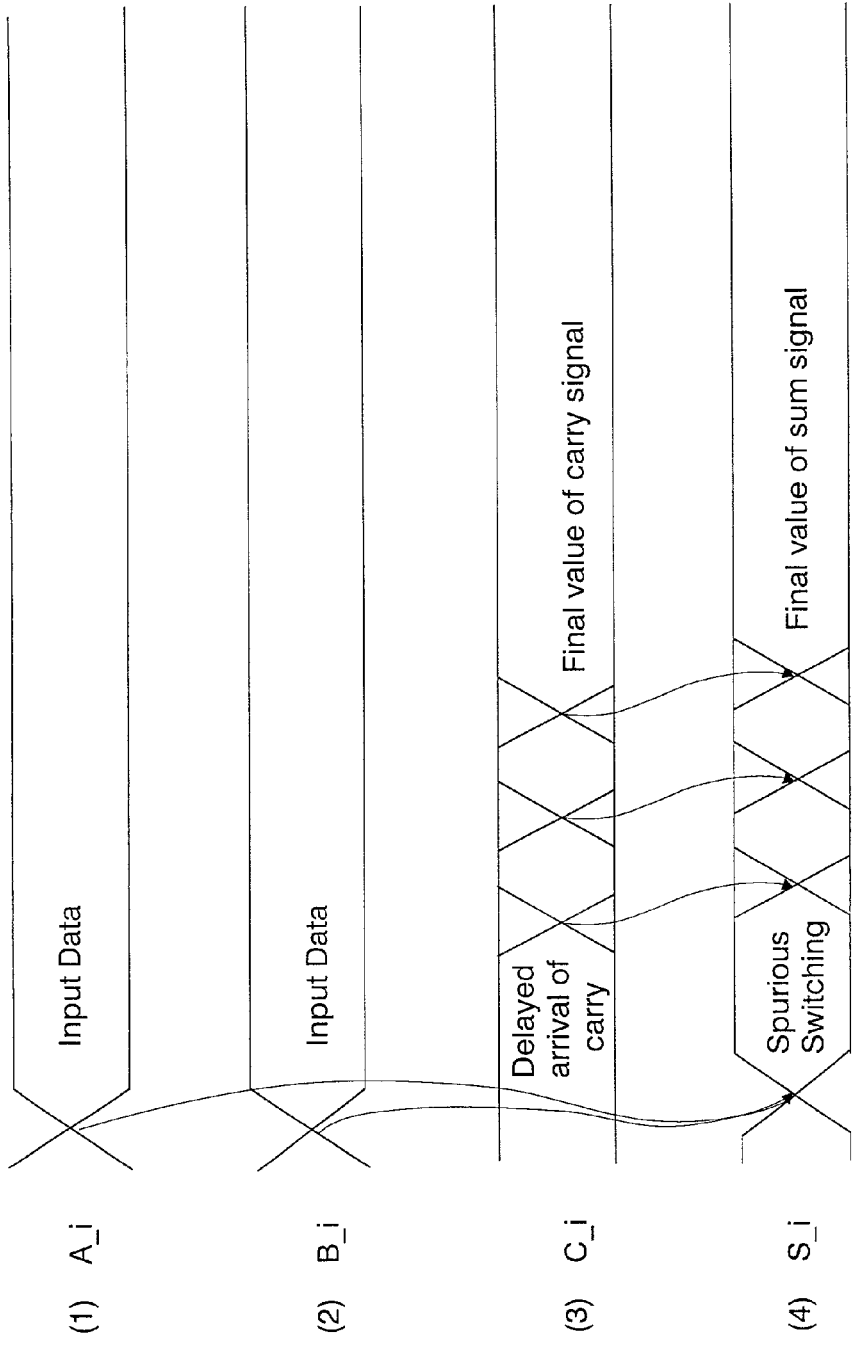

Single Bit Adder

Alternative Single Bit Adder

US 6,990,509 B2

ULTRA LOW POWER ADDER WITH SUM SYNCHRONIZATION

BACKGROUND OF THE INVENTION

1. Field of the Invention

The present invention relates generally to an ultra low power adder with sum synchronization, and more particularly pertains to an ultra low power adder with sum synchronization which provides a power reduction method in the binary carry propagate adders by using a carry skip technique.

The present invention provides a technique for eliminating glitches at the adder outputs by preventing signal transitions at the sum outputs until the corresponding carry signals have reached their final values, which is achieved by adding a synchronization circuitry to the sum calculation path.

2. Discussion of the Prior Art

FIG. 1 shows a conventional prior art single bit adder. A conventional prior art multi-bit carry propagate adder consists of a plurality of single-bit adders as illustrated in FIG. 1. Each single bit adder consists of a sum circuitry 10 and a carry circuitry 12, each of which receives two data inputs $A\_i$ and $B\_i$ and a carry signal $C\_i$. Various techniques exist for speeding up the carry propagation process, such as carry skip adder, carry select adder, etc. In most types of adders, the arrival of the carry signal $C\_i$ to inputs of individual single bit adders is delayed compared to the arrival of the data inputs $A\_i$ and $B\_i$.

FIG. 2(a) illustrates an exemplary prior art multi-bit addition process wherein a number of single bit adders are connected in series with a carry output $C\_i$ from the first single bit adder to the second single bit adder, a carry output $C\_i+1$ from the second single bit adder to the third single bit adder, and a carry output $C\_i+2$ from the third single bit adder, and etc.

FIG. 2(b) illustrates waveforms for the second single bit adder of FIG. 2(a), and illustrates in (1) and (2) input signals $A\_i$, $B\_i$, and in (3) the delayed arrival of and spurious switching of the carry signal $C\_i$, and in (4) the spurious switching of the final values of the sum signal.

The waveforms of FIG. 2 (b)(3) show that the carry signal $C\_i$ may undergo a number of spurious transitions before settling to a final value. This causes glitches and spurious switching at the sum output of the adder, as shown in FIG. 2 (b)(4). These glitches in turn lead to extra power dissipation in the circuitry generating the sum outputs. Although FIG. 2 shows a simple carry-ripple adder, the same problem exists in most conventional adders used commercially in industry.

Moreover, glitches at the outputs of the adder propagate to the data bus going to the unit using the adder, for example, to the register file, address generation unit, etc. Since these busses typically have a significant capacitive load, glitches at the adder outputs lead to even higher power dissipation.

As opposed to very high performance implementations, CMOS adder designs which are optimized for low power applications tend to have less stringent requirements in terms of the time necessary to accomplish an add operation. Therefore these kinds of adders use the carry propagate type of adder, due to the small number of transistors in such designs.

The following two major drawbacks exist in the prior art with respect to using carry propagate adders:

1. The small device size of such low power designs makes the carry propagate path slow. The carry skip technique is a well known way to speed up the carry path by bypassing blocks of adder cells. Another well known method called carry select calculates two results (one for carry input being binary "0" represented by a +Vss level, the other for binary "1" represented by a +Vdd level), and once the real carry is available, uses it as the select signal to decide which one of the precalculated results is the final answer of the add operation. These techniques minimize the number of logic blocks used in the carry propagate path for improved speed.
2. The time lag in the arrival of the two input operands and the carry input for every bit position causes spurious switching activity in the sum calculation circuitry. The present invention addresses and solves this problem.

SUMMARY OF THE INVENTION

Accordingly, it is a primary object of the present invention to provide an ultra low power adder with sum synchronization which reduces spurious switching of carry propagate binary adder designs by using a sum synchronization technique to lower the power dissipation.

The present invention synchronizes the output of the carry skip blocks with the internal signals, the so-called propagates, to accomplish these objectives. The invention can be applied to other adder structures as well.

In accordance with the teachings herein, the present invention provides a technique for eliminating glitches at the adder outputs by preventing signal transitions at the sum outputs until the corresponding carry signals have reached their final values, which is achieved by adding a synchronization circuitry to the sum calculation path.

BRIEF DESCRIPTION OF THE DRAWINGS

The foregoing objects and advantages of the present invention for an ultra low power adder with sum synchronization may be more readily understood by one skilled in the art with reference being had to the following detailed description of several embodiments thereof, taken in conjunction with the accompanying drawings wherein like elements are designated by identical reference numerals throughout the several views, and in which.

Figure 1:
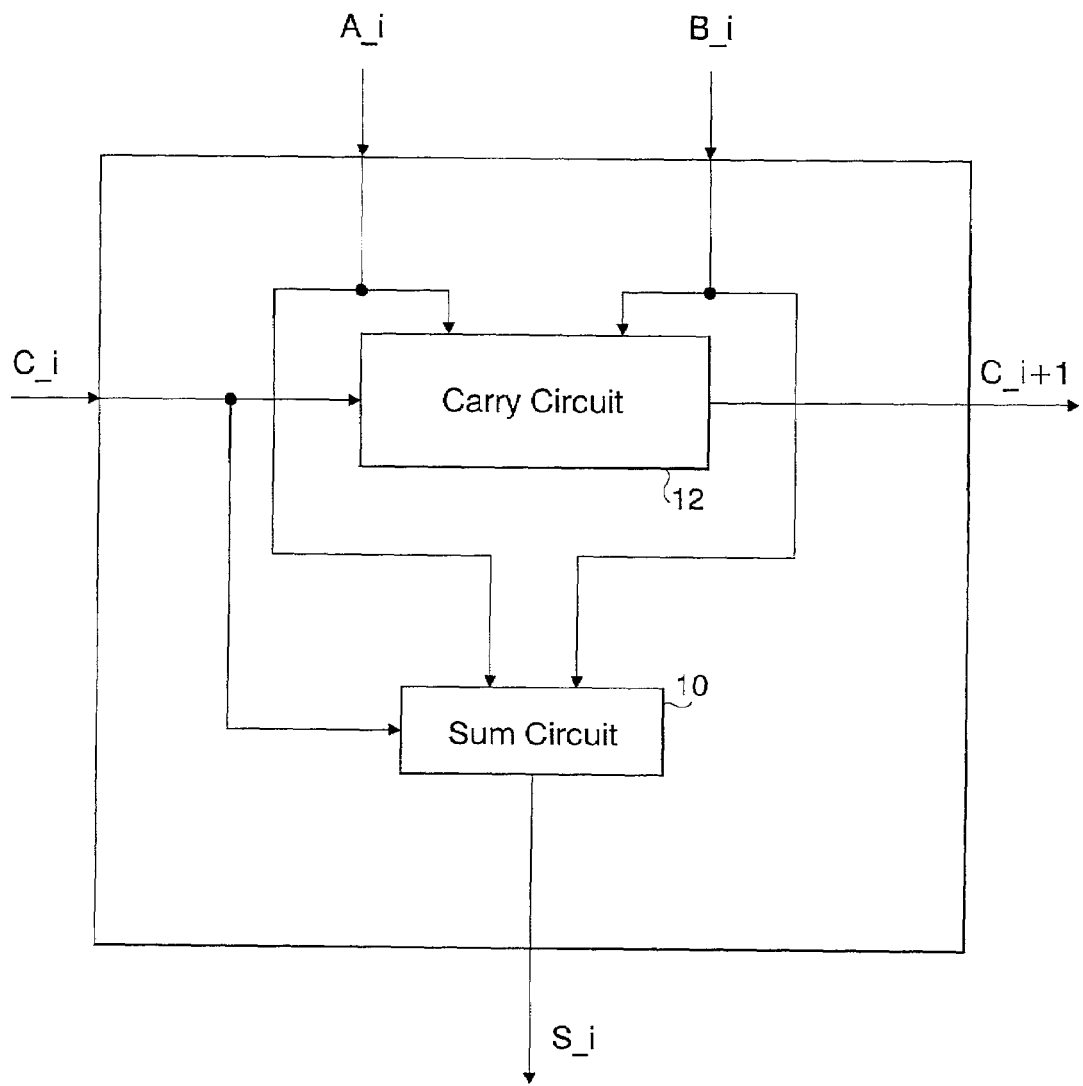
FIG. 1 shows a conventional prior art single bit adder which consists of a sum circuitry and a carry circuitry.
Figure 2A:
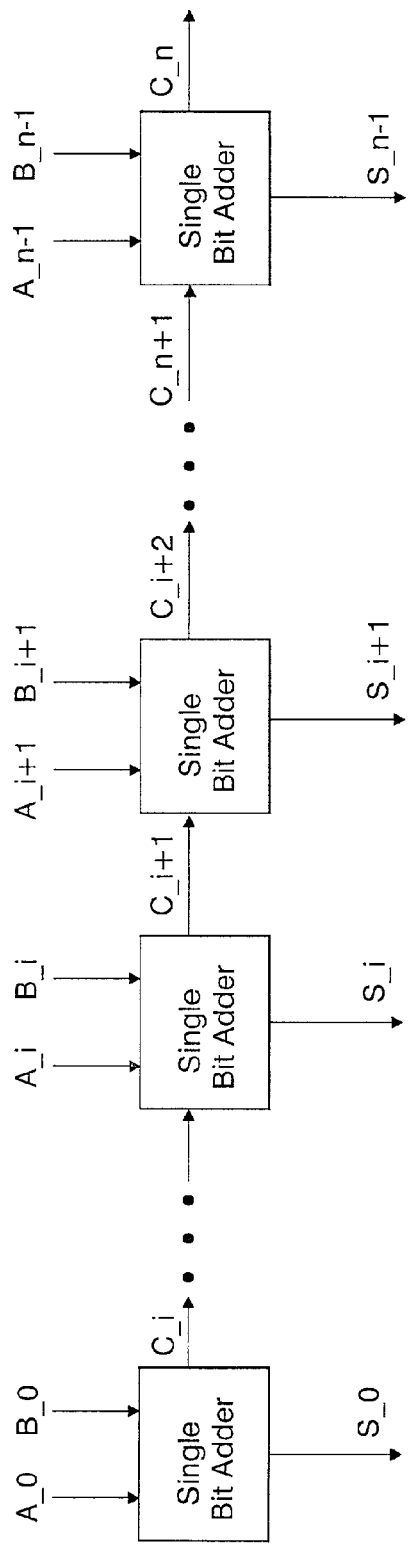
FIG. 2(a) illustrates an exemplary prior art addition process wherein a number of single bit adders are connected in series with a carry output $C\_i$ from the first single bit adder to the second single bit adder, a carry output $C\_i+1$ from the second single bit adder to the third single bit adder, and etc.

The waveforms of FIG. 2(b) show that the carry signal may undergo a number of spurious transitions before settling to a final value, which causes glitches at the sum outputs of the adder and leads to extra power dissipation in the circuitry generating the sum outputs as well as the circuitry connected to the adder output.

Figure 3:
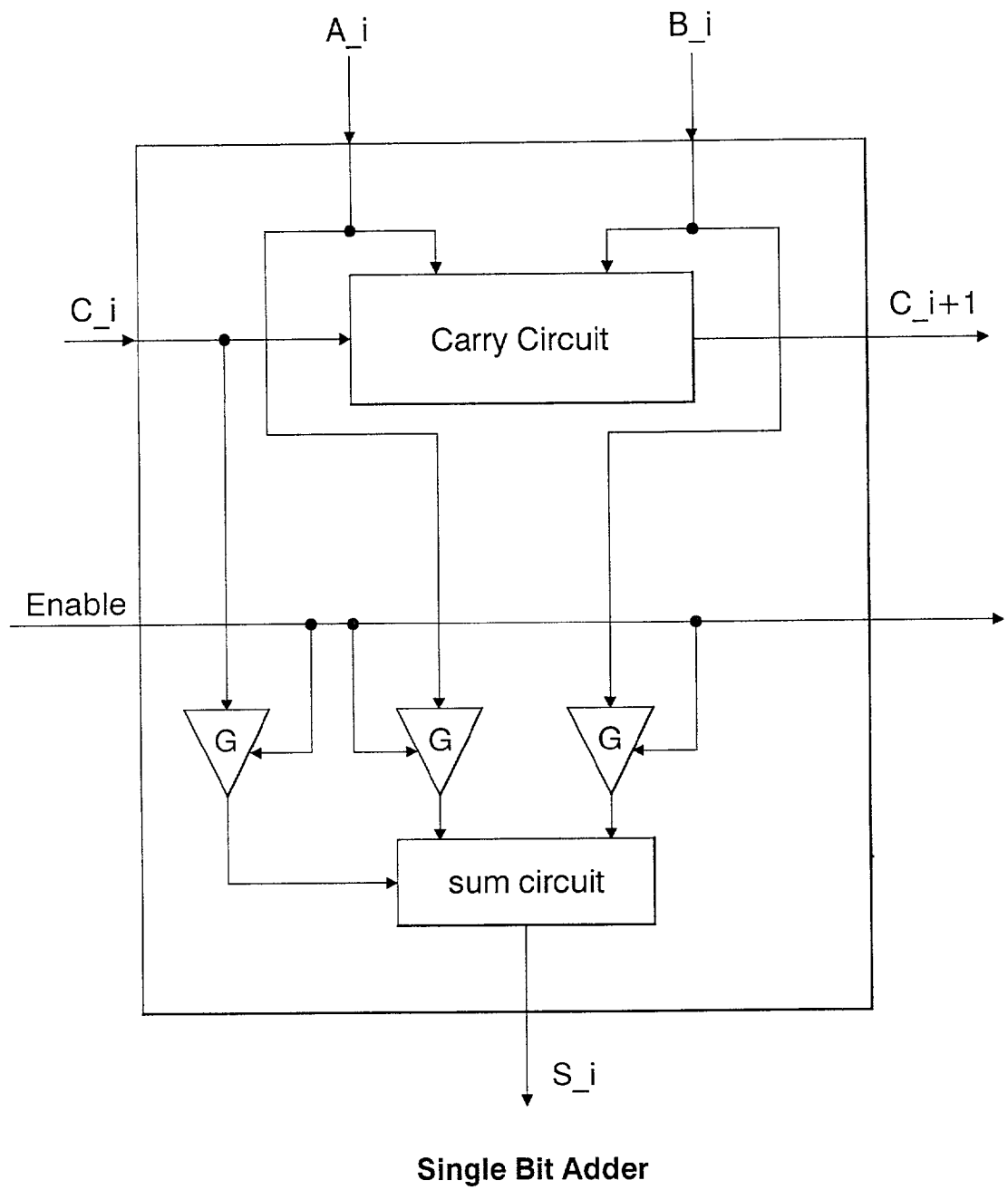

FIG. 3 illustrates a first embodiment of an ultra low power adder with sum synchronization pursuant to the present invention which adds single bit adder synchronization circuitry to the sum calculation path.

Figure 4A:
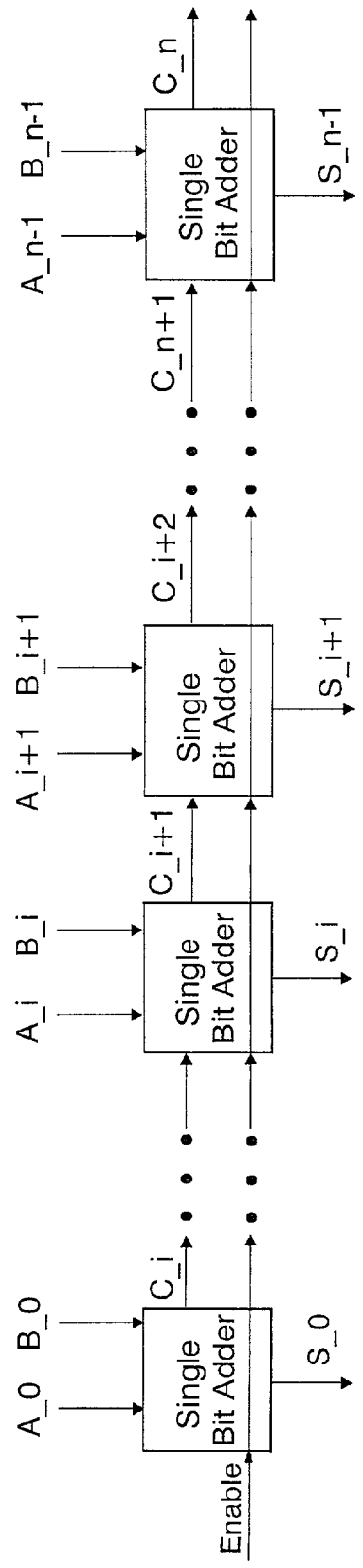

FIG. 4(a) illustrates an exemplary addition process pursuant to the present invention wherein a number of ultra low power single bit adders are connected in series.

Figure 4B:
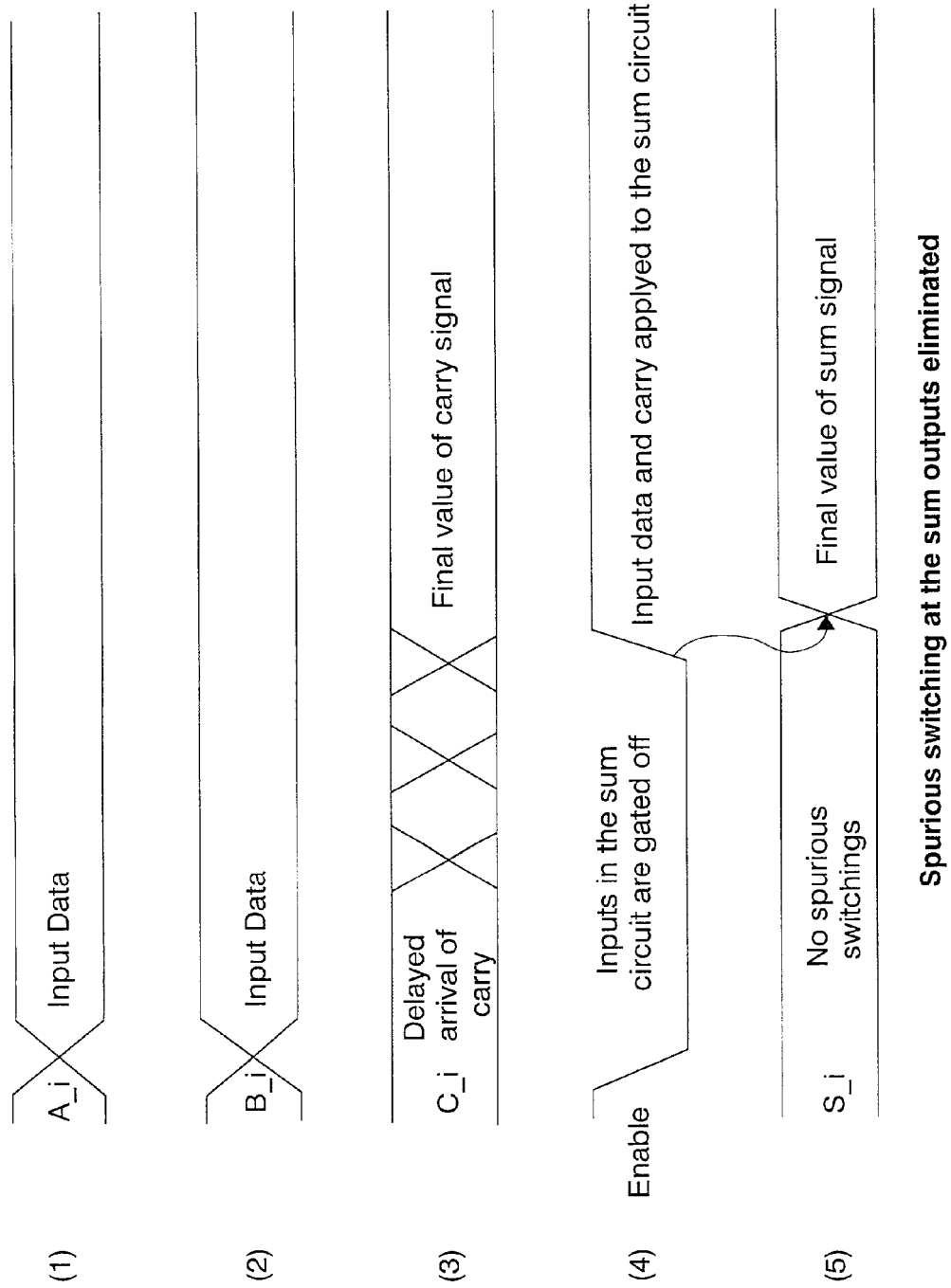

FIG. 4(b) illustrates waveforms for operation of the ultra low power adder of FIG. 4(a) which show that the final sum signals are generated without switching to any other intermediate state, which eliminates spurious transitions on the data bus, saving a substantial amount of power.

Figure 5:
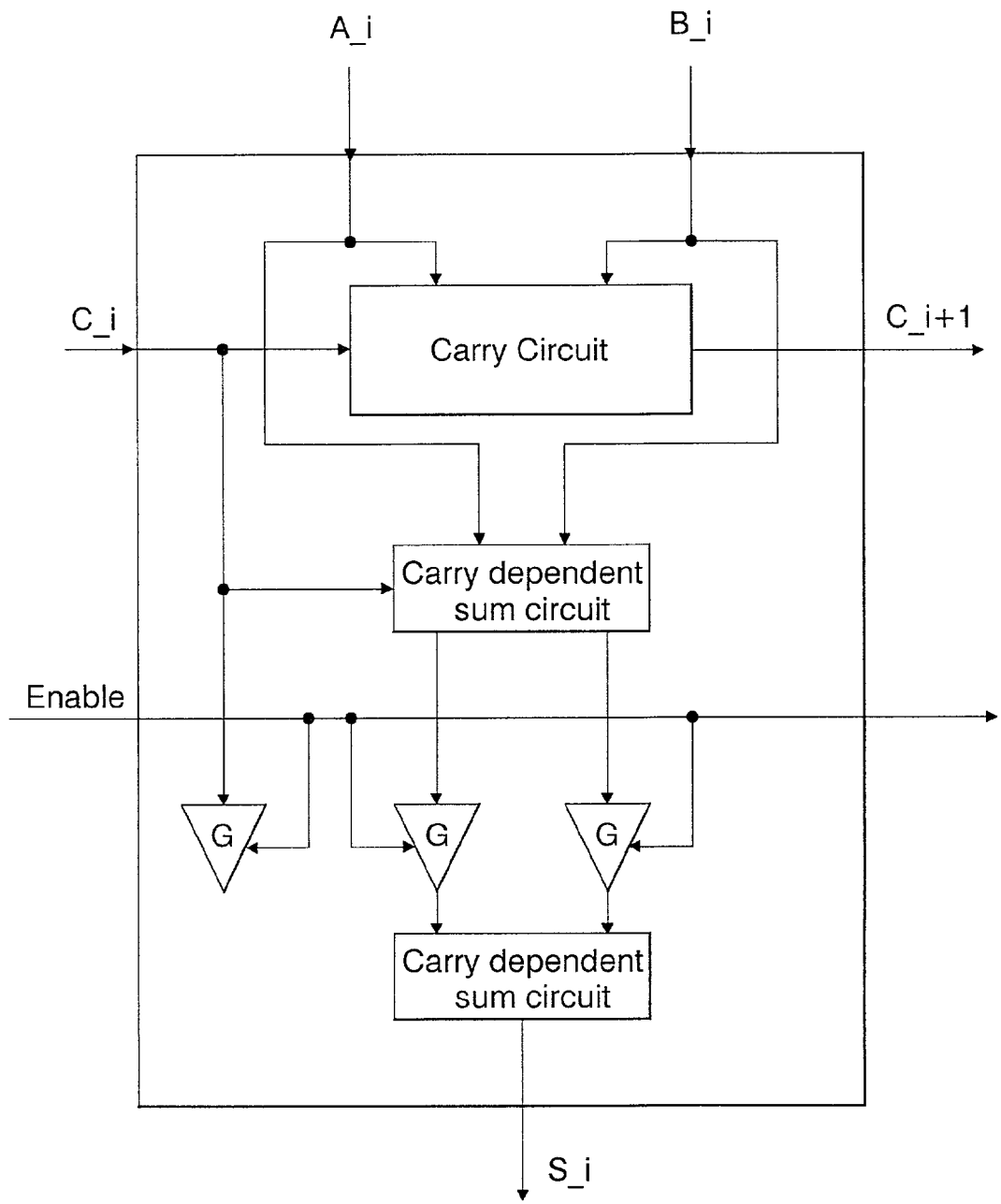

FIG. 5 shows an alternative embodiment of an ultra low power bit adder pursuant to the present invention wherein the carry-independent part of the sum circuitry is separated from the carry-dependent part, and only inputs to the carry-dependent part of the sum circuitry are gated by an Enable signal, to minimize the delay from the arrival of the Enable signal to the sum output.

DETAILED DESCRIPTION OF THE DRAWINGS

The present invention provides a technique for eliminating glitches at adder outputs by preventing signal transitions at the sum outputs until the corresponding carry signals have reached their final values. This result is achieved by adding a synchronization circuitry to the sum calculation path, as illustrated by the embodiments of ultra low power adders with sum synchronization shown in FIGS. 3 and 5.

FIG. 3 illustrates a first embodiment of an ultra low power adder with sum synchronization pursuant to the present invention which adds single bit adder synchronization circuitry to the sum calculation path. The synchronization circuit consists of transition barriers such as tristate gates G. When an enable signal Enable is low, the tristate gates are disabled, isolating the inputs to the sum circuitry from transitions on the inputs $A\_i$, $B\_i$ and $C\_i$.

A high value of the Enable signal enables the transition barriers or tristate gates G. The Enable signal is timed in such a way that it goes high with a delay equal to the worst-case delay through the carry path, that is always after the carry has reached its final value. After the transition barriers or tristate gates G are enabled, the new values of $A\_i$, $B\_i$ and $C\_I$ are allowed to propagate to the inputs of the sum circuit. As a result, the final sum signals are generated without spurious switchings to any other intermediate states, as shown in FIG. 4(b)(5). This approach eliminates spurious transitions on the data bus, saving a substantial amount of power.

FIG. 4(a) illustrates an exemplary addition process pursuant to the present invention wherein a number of ultra low power single bit adders are connected in series with a carry output $C\_i$ from the first single bit adder to the second single bit adder, and a carry output $C\_{i+1}$ from the second single bit adder to the third single bit adder, and a carry output $C\_{i+2}$ from the third single bit adder, and etc.

FIG. 4(b) illustrates waveforms for the second single bit adder of FIG. 4(a), and illustrates in (1) and (2) input signals $A\_i$, $B\_i$, and in (3) the delayed arrival of and spurious switching of the carry signal $C\_i$, and in (4) the delayed switching of the Enable switching until after the carry signal $C\_i$ has reached its final value, such that in FIG. 4(b)(5) there is no spurious switching of the final value of the sum signal $S\_i$, which is generated only after the carry signal $C\_i$ has reached its final value.

The particular amount of power savings depends upon the capacitance seen by the sum outputs of the adder. For example, a 0.5 mm wire with other units connected to it may have a capacitance of 0.2 pF, depending upon the technology. With a 1.5V power supply, every glitch at the sum output dissipates $0.2 pF*(1.5 V)^2=0.45 pJ$. Depending upon the input patterns, there can be several spurious transitions at the sum output of a conventional adder in each clock cycle. Assuming an average of 0.5 spurious pulses per clock cycle and a 1 GHz clocking rate, the average power dissipated by spurious transitions at the sum outputs of a 64-bit adder is $0.5*64*0.45 pJ*1 GHz=15 mW$.

Since the total number of adders on a chip can be as high as 10, the total on-chip power savings is estimated to be 150 mW. Compared to the typical power dissipation of a low-power adder for the same technology level (2 mW for 10 adders plus the power of driving the data lines), the savings achieved is quite significant, and definitely warrants or overweighs the added overhead for generating and distributing the Enable signal.

There are many ways to generate the Enable signal. It can be generated using the clock signal, or by a path through the adder similar to the longest-delay carry path, or by a combination of both. The effect of this approach on the delay through an adder is negligible, particularly since the carry path which determines the worst case delay through the adder is not affected.

FIG. 5 shows an alternative embodiment of an ultra low power bit adder of the present invention wherein the carry-independent part of the sum circuitry is separated from the carry-dependent part of the sum circuitry. Only inputs to the carry-dependent part of the sum circuitry are gated by the Enable signal. Such an organization minimizes the delay from the arrival of the Enable signal to the generation of the sum output.

While several embodiments and variations of the present invention for an ultra low power adder with sum synchronization are described in detail herein, it should be apparent that the disclosure and teachings of the present invention will suggest many alternative designs to those skilled in the art.

Having thus described our invention, what we claim as new, and desire to secure by Letters Patent is:

1. An n-bit adder comprising:
   logic for generating carry signals and sum output signals for each individual bit position i receiving inputs $A\_i$, $B\_i$ and $C\_i$, the logic for generating sum signals including logic means for preventing signal transitions on the sum output until all carry signals have reached final values, said logic means including single bit adder synchronization circuitry in the sum calculation path of the logic for generating sum signals, the synchronization circuitry comprising barriers which are enabled or disabled by an enable signal, and the barriers are disabled to isolate the inputs to the sum circuitry from transitions on the inputs $A\_i$, $B\_i$ and $C\_i$, the enable signal being timed with a delay equal to the worst-case delay through the carry path, after the carry signal has reached its final value, thereby preventing false intermediate values from reaching the sum output.

2. The n-bit adder of claim 1, wherein a high value of the enable signal enables the barriers, and after the barriers are enabled, the new values of $A\_i$, $B\_i$ and $C\_i$ are allowed to propagate to the inputs of the sum circuit.

3. The n-bit adder of claim 1, wherein the barriers are tristate gates.

4. The n-bit adder of claim 1, wherein the enable signal is generated using the clock signal.

5. The n-bit adder of claim 1, wherein the enable signal is generated using a path through the adder similar to the longest-delay carry path.

6. The n-bit adder of claim 1, wherein the enable signal is generated using a combination of the clock signal and a path through the adder similar to the longest-delay carry path.

7. The n-bit adder of claim 1, wherein the enable signal is generated using a combination of the clock signal and a path through the adder similar to the longest-delay carry path.

8. A single-bit adder comprising:
a sum circuitry and a carry circuitry, each of which receives two data inputs $A\_i$ and $B\_i$ and an input carry signal $C\_i$, and logic for generating an output carry signal and an output sum signal;
the logic for generating the output sum signal including logic means for preventing signal transitions on the sum output until the input carry signal $C\_i$ has reached a final value, said logic means including single bit adder synchronization circuitry in the sum calculation path of the logic for generating sum signals, the synchronization circuitry comprising barriers which are enabled or disabled by an enable signal, and the barriers are disabled to isolate the inputs to the sum circuitry from transitions on the inputs $A\_i$, $B\_i$ and $C\_i$, the enable signal being timed with a delay equal to the worst-case delay through the carry path, after the carry signal has reached its final value, thereby preventing false intermediate values from reaching the sum output.

9. The single-bit adder of claim 8, wherein a high value of the enable signal enables the barriers, and after the barriers are enabled, the new values of $A\_i$, $B\_i$ and $C\_i$ are allowed to propagate to the inputs of the sum circuit.

10. The single-bit adder of claim 8, wherein the barriers are tristate gates.

11. The single-bit adder of claim 8, wherein the enable signal is generated using the clock signal.

12. The single-bit adder of claim 8, wherein the enable signal is generated using a path through the adder similar to the longest-delay carry path.

13. The single-bit of claim 8, wherein the enable signal is generated using a combination of the clock signal and a path through the adder similar to the longest-delay carry path.

14. The single-bit of claim 8, wherein a carry-independent part of the sum circuitry is separated from a carry-dependant part of the sum circuitry, and only inputs to the carry-dependent part of the sum circuitry are gated by the enable signal, to minimize the delay from the arrival of the enable signal to the generation of the sum output.

* * * * *